(No Model.)

C. J. BAILEY.
ERASER.

No. 392,253.   Patented Nov. 6, 1888.

Witnesses.
Fred. S. Greenleaf.
Frederick L. Emery.

Inventor.
Charles J. Bailey.
By Crosby & Gregory.
Attys.

UNITED STATES PATENT OFFICE.

CHARLES J. BAILEY, OF NEWTON, MASSACHUSETTS.

ERASER.

SPECIFICATION forming part of Letters Patent No. 392,253, dated November 6, 1888.

Application filed July 9, 1888. Serial No. 279,441. (No model.)

*To all whom it may concern:*

Be it known that I, CHARLES J. BAILEY, of Newton, county of Middlesex, State of Massachusetts, have invented an Improvement in Erasers, of which the following description, in connection with the accompanying drawings, is a specification, like letters on the drawings representing like parts.

This invention has for its object to provide a piece of erasive rubber with a blade which may be used as an eraser.

In accordance with this invention the block or piece of erasive rubber which I prefer to use is one comprising a body and a number of small cylindrical teeth arranged upon the under side thereof. A rectangular slot or passage is formed in the body, in which is placed a blade having an inclined sharp or cutting edge. The shank of the blade has a suitable projection slightly protruding from one side of the body, which may be engaged by the finger or thumb of the operator when it is desired to move the cutter. The slot or passage in which the blade is placed is sufficiently long to admit the blade being drawn in and entirely concealed when not in use.

Figure 1:
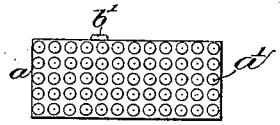
Figure 2:
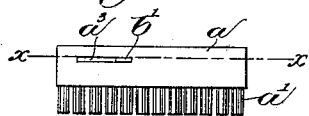
Figure 3:
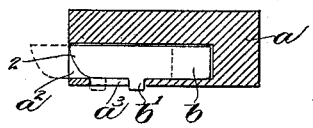

Figure 1 shows an under side view of an eraser embodying this invention; Fig. 2, a side view of the eraser shown in Fig. 1; Fig. 3, a horizontal section of the eraser shown in Fig. 2, taken on the dotted lines $x$ $x$.

The block or piece of erasive rubber herein shown comprises the body $a$, having formed or arranged upon its under side many short cylindrical teeth $a'$. The block has at its end a horizontal rectangular passage, $a^2$, intersected by a side slot, as at $a^3$. The blade $b$, having at one end an inclined cutting-edge, as 2, is placed in the slot or passage $a^2$, and is adapted to be moved therein horizontally.

The shank of the blade $b$, at one side, has a projection, $b'$, which passes through the slot or opening $a^3$ and slightly protrudes beyond the side of the body. The passage $a^2$ is made as long as or slightly longer than the blade $b$, and when the blade is engaged by its projection $b'$ and moved rearwardly it may be entirely concealed within the body $a$; but when it is desired to use the blade it may be pushed outwardly by the projection $b'$.

The blade $b$ will be used as an eraser. It will seem in this invention that a piece of erasive rubber and a knife-eraser are embodied in one article in compact form. It is obvious that the piece of erasive rubber employed may be of any other desired shape. The blade may be embedded in the rubber and held permanently.

I do not herein broadly claim a block or piece of rubber having formed or arranged upon its under side many short cylindrical teeth, the same being included in my application for a patent filed October 3, 1887, Serial No. 251,335.

I claim—

1. The combination, with a blade, $b$, of a piece of erasive rubber having a slot or passage, as $a^2$, within which the said blade may be retreated or withdrawn, substantially as described.

2. The combination, with a piece of erasive rubber having a slot or passage, as $a^2$, and the slot $a^3$, of the blade $b$, having the cutting-edge 2 and the lateral projection $b'$, all substantially as and for the purposes set forth.

3. The combination, with a piece of erasive rubber, of a blade permanently secured thereto, substantially as described.

In testimony whereof I have signed my name to this specification in the presence of two subscribing witnesses.

CHARLES J. BAILEY.

Witnesses:
  BERNICE J. NOYES,
  J. L. EMERY.